United States Patent
Fukumoto (10) Patent No.: US 8,325,224 B2
(45) Date of Patent: Dec. 4, 2012

(54) HEAD SEPARATION CAMERA APPARATUS

(75) Inventor: Junya Fukumoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/961,246

(22) Filed: Dec. 6, 2010

(65) Prior Publication Data

US 2011/0157341 A1 Jun. 30, 2011

(30) Foreign Application Priority Data

Dec. 25, 2009 (JP) .................................. 2009-296137

(51) Int. Cl.
*H04N 7/18* (2006.01)
*H04N 17/00* (2006.01)
(52) U.S. Cl. .......................................... 348/61; 348/187
(58) Field of Classification Search .................. 348/335, 348/375, 207, 65, 72, 73, 74, 211.14, 333, 348/373, 376, 222.1, 224, 228, 239, 360, 348/361, 358, 347, 312, 213, 187, 61
See application file for complete search history.

(56) References Cited

U.S. PATENT DOCUMENTS

| | | | | |
|---|---|---|---|---|
| 4,860,113 A * | 8/1989 | Miyamoto et al. | ............ | 348/187 |
| 5,003,399 A * | 3/1991 | Ishimaru et al. | ............. | 348/361 |
| 5,608,457 A * | 3/1997 | Tohyama et al. | ............. | 348/335 |
| 5,623,310 A * | 4/1997 | Kim | ........................... | 348/394.1 |
| 5,911,086 A * | 6/1999 | Miyazawa et al. | ............. | 396/96 |
| 6,150,953 A * | 11/2000 | Tanaka et al. | .................. | 340/3.1 |
| 6,348,948 B1 * | 2/2002 | Kyuma | .......................... | 348/360 |
| 7,471,310 B2 * | 12/2008 | Amling et al. | .................. | 348/72 |
| 8,059,160 B2 * | 11/2011 | Shinozaki et al. | ........ | 348/211.14 |
| 2008/0267601 A1 * | 10/2008 | Kobayashi | ....................... | 396/91 |
| 2010/0020197 A1 * | 1/2010 | Ozaki | ....................... | 348/231.99 |
| 2010/0302391 A1 | 12/2010 | Shinozaki et al. | | |
| 2012/0013755 A1 * | 1/2012 | Shinozaki et al. | ........ | 348/211.14 |

FOREIGN PATENT DOCUMENTS

| | | |
|---|---|---|
| JP | 09-294223 | 11/1997 |
| JP | 11-069221 | 3/1999 |
| JP | 11-252438 | 9/1999 |
| JP | 2004-187127 | 7/2004 |
| JP | 2005-311535 | 11/2005 |
| JP | 2006-020293 | 1/2006 |
| JP | 4-519938 | 8/2010 |

* cited by examiner

*Primary Examiner* — Behrooz Senfi
(74) *Attorney, Agent, or Firm* — Blakely, Sokoloff, Taylor & Zafman LLP (57) ABSTRACT

According to one embodiment, a head separation camera apparatus includes an imaging device, a control device and a cable. The control device includes a first controller. The first controller is configured to output the control signal including a selection command to notify a controlled device acting as a control target from one or more controlled devices in the imaging device and control data indicating contents of control of the control target. The imaging device includes a second controller. The second controller is configured to transmit an individual selection command to inform whether or not a device is the control target and the control data to at least the controlled device acting as the control target, based on the selection command.

18 Claims, 5 Drawing Sheets

| Identifier for signal control | CS 1 | CS 2 | CS 3 | CS 4 | RST 1 | RST 2 | RST 3 | RST 4 |

Each 1 bit represents the output of the corresponding signal.
0 = Low, 1 = High

F I G. 3

| Starting bit | Controlled device 1 | Controlled device 2 | Controlled device 3 | Controlled device 4 | CS/ RST | Number of bits in the next command | End bit |

HEAD SEPARATION CAMERA APPARATUS

CROSS-REFERENCE TO RELATED APPLICATIONS

This application is based upon and claims the benefit of priority from Japanese Patent Application No. 2009-296137, filed Dec. 25, 2009; the entire contents of which are incorporated herein by reference.

FIELD

Embodiments described herein relate generally to a head separation camera apparatus which has a camera head and a camera control unit controlling the head separated from each other.

BACKGROUND

As is well known, a head separation camera apparatus comprises a camera head and a camera control unit (CCU) which are provided separately. The camera head includes a solid-state image sensor, such as a charge-coupled device (CCD) sensor or a complementary metal-oxide semiconductor (CMOS) sensor. The CCU supplies a drive control signal to the solid-state image sensor of the camera head and performs signal processing on the output of the solid-state image sensor to produce a video signal. The camera head and the CCU are connected via a cable composed of a plurality of signal lines bundled together.

Since the head separation camera apparatus has been used in a broad range of industries, it is hoped that the apparatus will get more sophisticated and offer a higher performance. In the head separation camera apparatus, the types of signals and the number of bits exchanged between the camera head and the CCU are increasing dramatically. Accordingly, the number of signal lines in the camera cable increases and therefore the cable gets thicker. In addition, the number of terminals of the connector that connects the camera cable and the camera head increases, making the connector larger.

In general, the head separation camera apparatus has been developed to check areas which are so narrow that a person cannot enter the areas. Therefore, it is hoped that the camera head will be made as smaller as possible. The thicker camera cable and the larger connector connecting with the camera cable become factors that prevent the camera head from being made smaller. Therefore, the problem of preventing the camera cable from getting thicker and the connector from getting larger becomes important.

Jpn. Pat. Appln. KOKAI Publication No. 2005-311535 has disclosed an imaging apparatus configured to have a camera head 117 and a control unit 118 separated from each other and cause the CPU 116 of the control unit 118 to transmit a control signal to a plurality of devices, including the microcomputer 106 of the camera head 117.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a head separation camera apparatus includes an imaging device, a control device and a cable. The control device includes a first controller. The first controller is configured to output the control signal including a selection command to notify a controlled device acting as a control target from one or more controlled devices in the imaging device and control data indicating contents of control of the control target. The imaging device includes a second controller. The second controller is configured to transmit an individual selection command to inform whether or not a device is the control target and the control data to at least the controlled device acting as the control target, based on the selection command.

Figure 1:
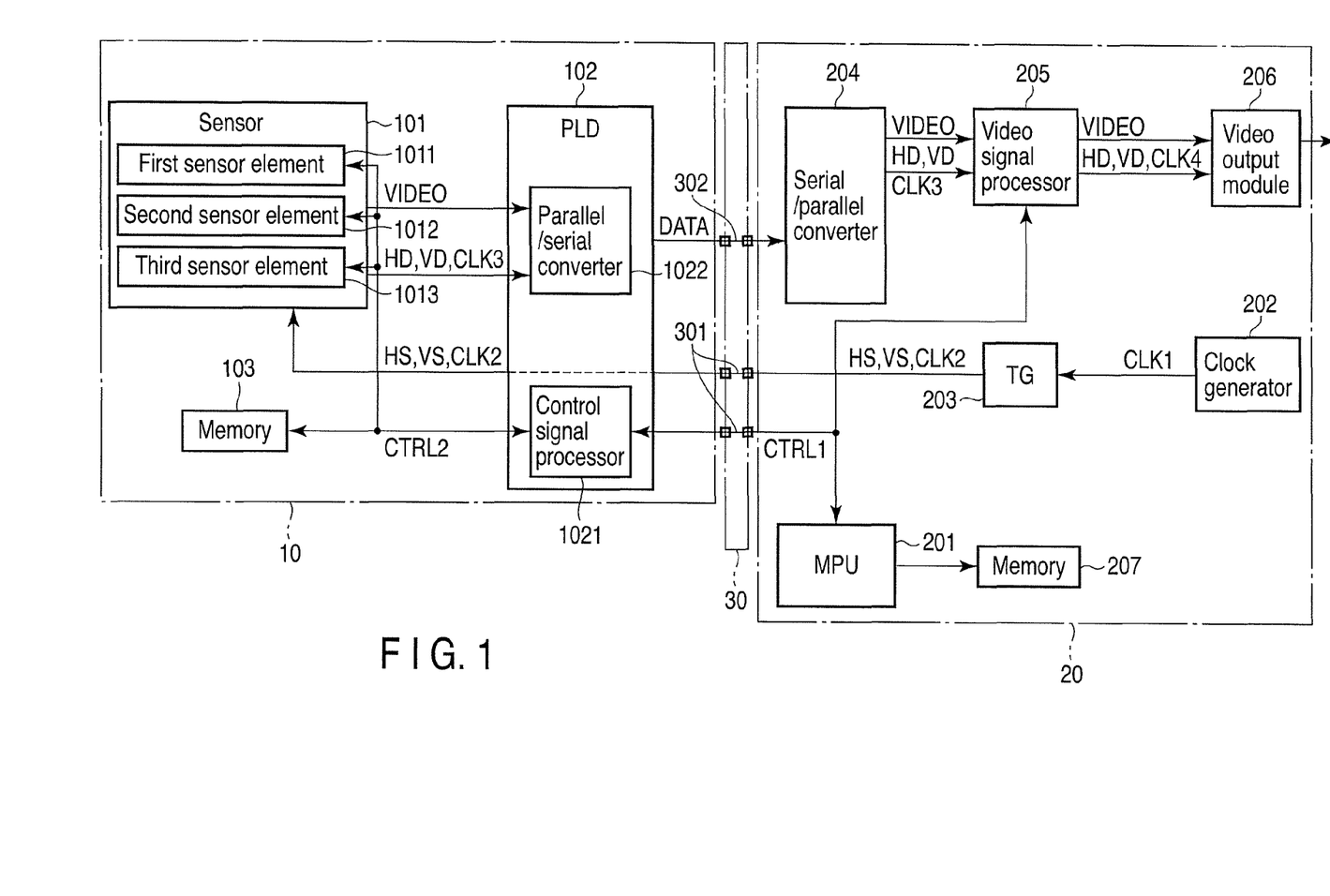
FIG. 1 is an exemplary block diagram of the signal processing system of a head separation camera apparatus according to a first embodiment.

Hereinafter, referring to the accompanying drawings, embodiments will be explained in detail. FIG. 1 shows the signal processing system of a head separation camera apparatus according to a first embodiment of the embodiment. The head separation camera apparatus is configured to have an imaging unit (hereinafter, referred to as a camera head) 10 and a control unit controlling the imaging unit (hereinafter, referred to as a CCU) 20 connected to each other with a camera cable 30. The head separation camera apparatus can be used at a place the length of the camera cable 30 away from the shooting location.

The camera head 10 comprises a sensor 101, a programmable logic device (PLD) 102, and a memory 103.

The sensor 101 is composed of a first sensor element 1011, a second sensor element 1012, and a third sensor element 1013 which correspond to R, G, B, respectively. The sensor 101 forms an optical image of an incident subject on a light-receiving surface. Then, the sensor 101 converts the optical image into a corresponding digital video signal. The sensor 101 is a digital sensor, such as a CMOS sensor.

The PLD 102 includes a control signal processor 1021 and a parallel/serial converter 1022. Under the control of the CCU 20, the control signal processor 1021 determines whether the first sensor element 1011, second sensor element 1012, third sensor element 1013, and memory 1014 are devices to be controlled by an micro processor unit (MPU) 201. The parallel/serial converter 1022 transmits to the CCU 20 serial data on which a video signal and a synchronizing signal have been superimposed. The memory 103 stores, for example, data on image quality adjustment and synchronous control of a video signal. The memory 103 is, for example, an electrically erasable and programmable Read-Only memory (EEPROM).

The CCU 20 comprises the MPU 201, a clock generator 202, a timing generator (TG) 203, a serial/parallel converter 204, a video signal processor 205, a video output module 206, and a memory 207.

Receiving information on user operation externally supplied, the MPU 201 controls the various parts constituting the camera head 10 and CCU 20 so as to reflect the operation information. The clock generator 202 generates a clock signal with a specific pulse characteristic.

The TG 203 generates drive control timing of the sensor 101 on the basis of the clock signal.

The serial/parallel converter 204 separates serial data transmitted from the camera head into parallel data.

The video signal processor 205 processes a video signal according to a specific setting value by an external requirement.

The video output module 206 converts the video signal into a signal in a desired video format and outputs an image on a monitor (not shown). The video format is, for example, High Definition-Serial Digital Interface (HD-SDI) or High Definition-Digital Visual Interface (HD-DVI). The memory 207 stores setting values for the operation of the CCU 20.

The camera cable 30 includes a control signal cable 301 and a data signal cable 302. The control signal cable 301 enables control signals to be exchanged between the camera head 10 and CCU 30. The data signal cable 302 enables a video signal to be transmitted from the camera head 10 to the CCU 30.

Next, the acquisition of the video signal by the CCU 20 will be explained according to the signal flow with reference to FIG. 1. First, the clock generator 202 generates a first clock signal (CLK1). The clock generator 202 supplies CLK1 to the TG 203. On the basis of CLK1, the TG 203 generates a horizontal synchronizing signal (HS), a vertical synchronizing signal (VS), a second clock signal (CLK2) for driving the sensor. The TG 203 transmits HS, VS, and CLK2 to the sensor 101 via the control signal cable 301.

The sensor 101 outputs a video signal (VIDEO), a video horizontal synchronizing signal (HD), a video vertical synchronizing signal (VD), and a third clock signal (CLK3) to restore an optical image. The parallel/serial converter 1022 converts in-phase video signal, HD, VD, and CLK3 into serial data and transmits the serial data to the CCU 20 via the data signal cable 302.

The serial/parallel converter 204 converts the video signal, HD, VD, and CLK3 transmitted in the form of serial data into parallel data. The video signal processor 205 processes the video signal according to the specific setting value. The video signal processor 205 supplies the processed video signal, HD, VD, and CLK4 to the video output module 206. The video output module 206 converts the video signal, HD, VD, and CLK4 into signals in a desired video format and outputs an image on a monitor (not shown).

The signal exchanged between the camera head 10 and CCU 20 may be converted into a low voltage differential signaling (LVDS) signal. In addition, the signal exchanged between the camera head 10 and CCU 20 may be corrected by an enhancer or equalizer.

Figure 2:
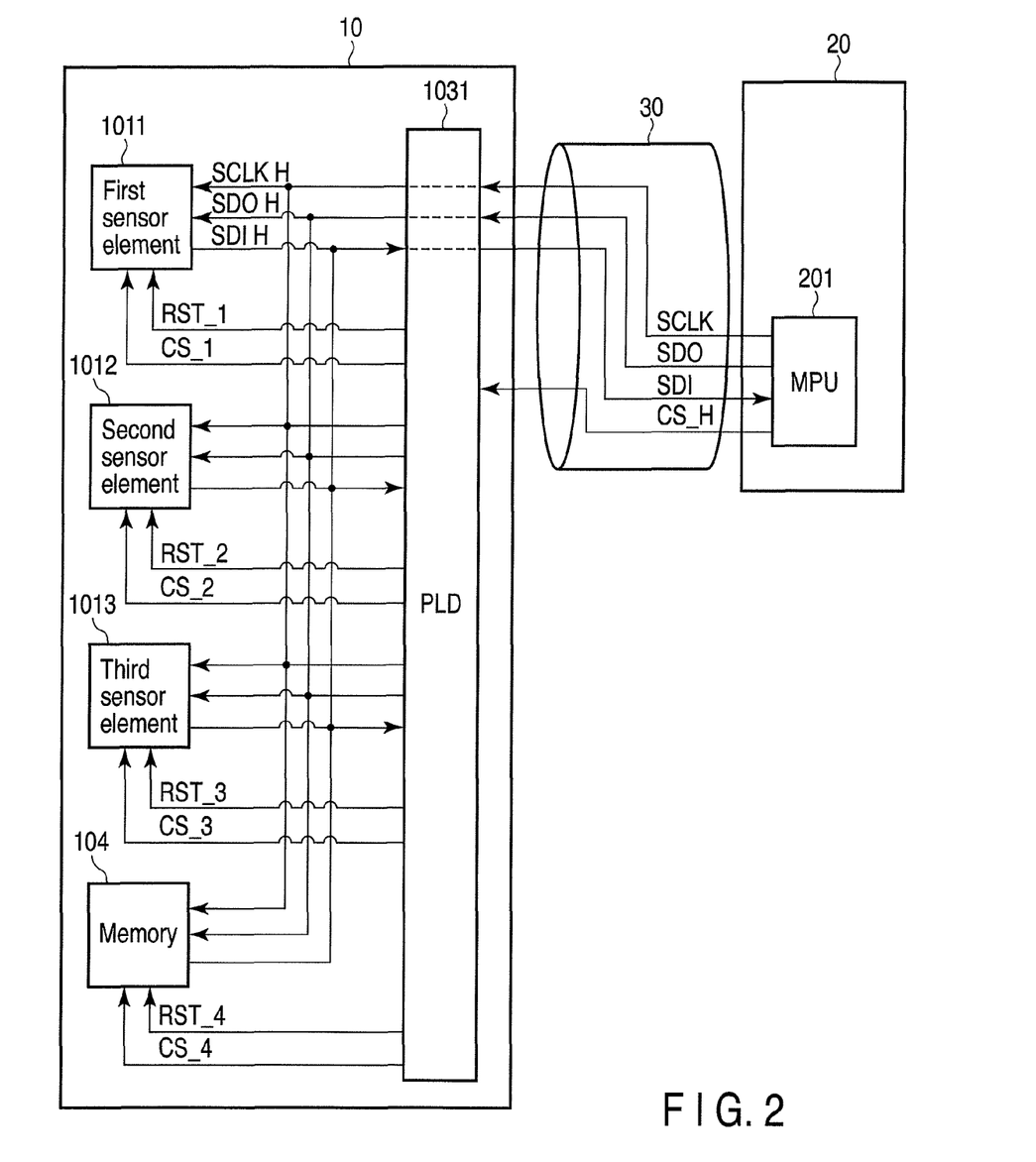
FIG. 2 is an exemplary block diagram showing the arrangement of signals lines in the head separation camera apparatus according to the first embodiment.

Next, the arrangement of the signal lines of the control signals in the camera head 10 and between the camera head 10 and CCU 20 will be explained. FIG. 2 is a block diagram showing the arrangement of the signal lines. In FIG. 2, suppose the devices controlled by the MPU 201 are the first sensor element 1011, second sensor element 1012, third sensor element 1013, and memory 103. Although the number of controlled devices is 4 in the explanation, the embodiment is not restricted to this.

Between the control signal processor 1021 of the camera head 10 and the MPU 201 of the CCU 20, there are provided signal lines for three-wire serial communication (serial clock (SCLK), serial output data (SDO) acting as a control signal, serial input data (SIO)) and a signal line for chip select (CS_H) signal acting as a signal for selecting a control target.

Of the signals transmitted through the signal lines for three-wire serial communication, the signal line for CS_H signal is for a signal for selecting one acting as a control target from the four controlled devices.

Next, the signal lines between the control signal processor 1021 of the camera head 10 and the controlled devices will be explained. Each of the four controlled devices has an RST signal input terminal, a CS signal input terminal, an SCLK input terminal, an SDO input terminal, and an SDI input terminal.

Between the control signal processor 1021 and the first sensor element 1011, there are provided signal lines for three-wire serial communication (SCLK_H, SDO_H, SDI_H) and a signal line for CS__1 (chip select) signal or a signal line for RST__1 (reset) signal. Similarly, between the control signal processor 1021 and the second sensor element 1012, there are provided signal lines for three-wire serial communication (SCLK_H, SDO_H, SDI_H) and a signal line for CS__2 (chip select) signal or a signal line for RST__2 (reset) signal. Between the control signal processor 1021 and the third sensor element 1013, there are provided signal lines for three-wire serial communication (SCLK_H, SDO_H, SDI_H) and a signal line for CS__3 (chip select) signal or a signal line for RST__3 (reset) signal. Between the control signal processor 1021 and the memory 103, there are provided signal lines for three-wire serial communication (SCLK_H, SDO_H, SDI_H) and a signal line for CS__4 (chip select) signal or a signal line for RST__4 (reset) signal.

Figure 3:
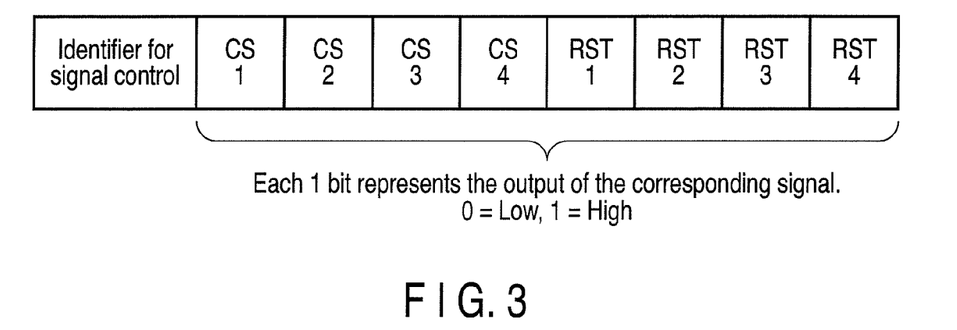
FIG. 3 is an exemplary illustration of the configuration of a signal control command according to the first embodiment.

FIG. 3 shows the configuration of a signal control command which is a bit stream included in the SDO temporarily, transmitted from the MPU 201 to the control signal processor 1021 in the first embodiment.

The signal control command is a command to select one of the four devices to be controlled by the MPU 201. A signal control identifier to distinguish the command from other commands to the control signal processor 1021 is provided at the head of the signal control command. In the signal control command, how the control signal processor 1021 controls each of the CS signal and RST signal of each of the controlled devices is represented in one bit after the signal control identifier.

For example, when CS__1 of the signal control command indicates 1, this means that the MPU 201 has not selected the first sensor element 1011 as a control target. The control signal processor 1021 transmits a high CS__1 signal to the first sensor element 1011. The control signal processor 1021 brings the first sensor element 1011 into a communication disable state (an inactive state). When CS__1 of the signal control command indicates 0, this means that the MPU 201 has selected the first sensor element 1011 as a control target. The control signal processor 1021 transmits a low CS__1 signal to the first sensor element 1011. The control signal processor 1021 brings the first sensor element 1011 into a communication enable state (an active state). The MPU 201 transmits a high CS_H signal or low CS_H signal constantly. The control signal processor 1021 transmits a high CS signal or low CS signal constantly to each of the four devices to be controlled by the MPU 201. Each of the CS_H signal and the CS signals is 1 bit signal which indicates availability of communication from the MPU 201 to each of the devices. While the CS_H signal is low, the control signal processor 1021 receives the signal control command as an available command. While the CS_H signal is high, the MPU 201 can transmit the SCLK_H and SDO_H to the four devices to be controlled by the MPU 201 through the control signal processor 1021.

That is, the control signal processor 1021 can control the signal level of each of the CS signal (individual selection signal) and RST signal for each of the controlled devices on the basis of the signal control command and therefore can set more than one signal to each of the controlled devices.

Next, the way the control signal processor 1021 controls each of the controlled devices on the basis of the signal control command will be explained.

The three-wire serial communication signal line carries a control signal to the four controlled devices. The signal line for CS_H signal carries a CS_H signal from the MPU 20 to the control signal processor 1021. On the basis of the selection of a control target by the signal control command, the signal line for CS__1 signal carries a CS__1 signal from the control signal processor 1021 to the first sensor element 1011. The same holds true for the CS__2 signal, CS__3 signal, and CS__4 signal. On the basis of the resetting of a control target by the CS_H signal, the signal line for RST__1 signal carries a CS__1 signal from the control signal processor 1021 to the first sensor element 1011. The same holds true for the RST__2 signal, RST__3 signal, and RST__4 signal.

Figure 4:
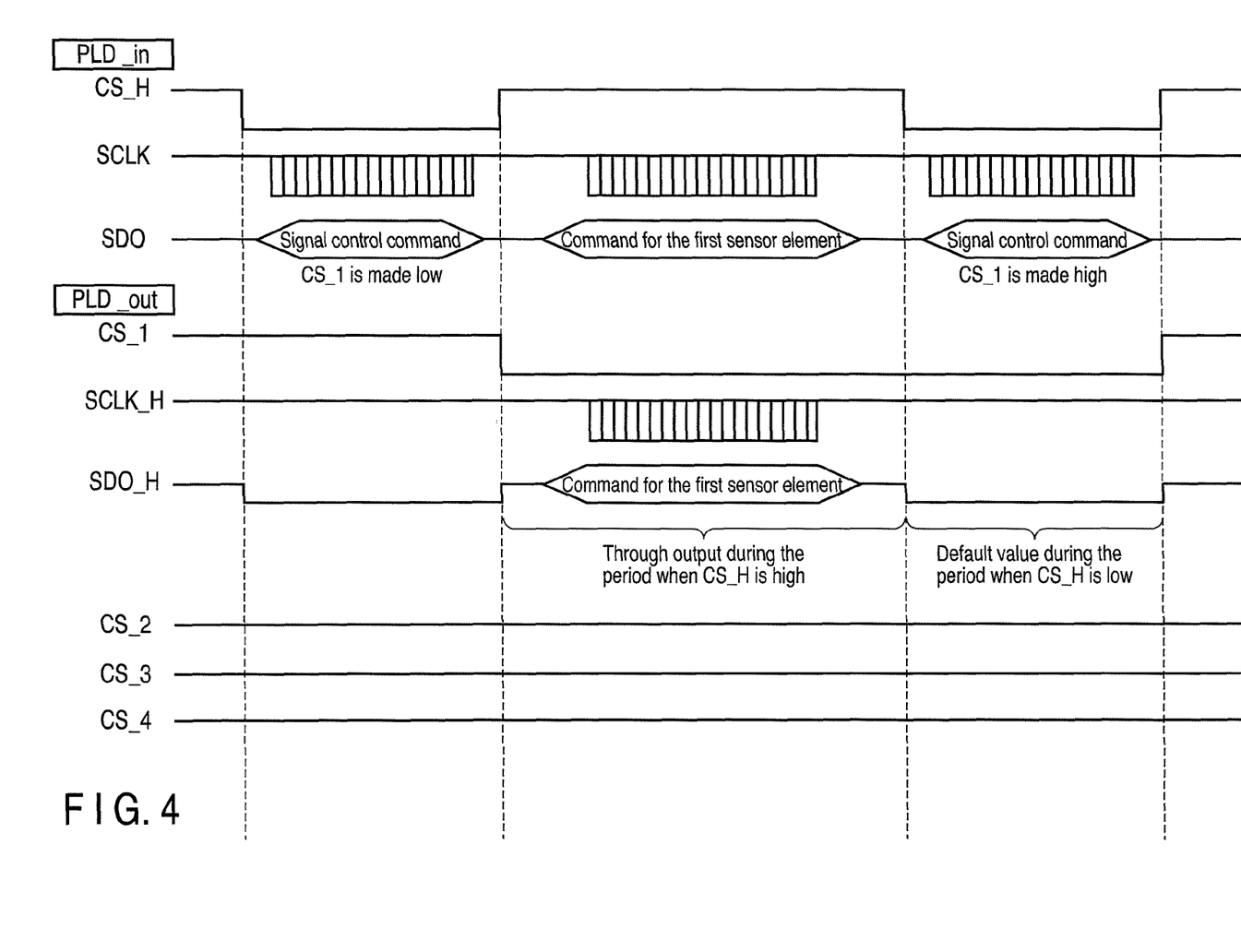
FIG. 4 is an exemplary timing chart in communicating with a first sensor element according to the first embodiment.

FIG. 4 is a timing chart when the MPU 201 transmits a control signal to the first sensor element 1011 acting as a control target. Waveforms of the CS_H signal, SCLOCK, and SDO transmitted from the MPU 201 to the control signal processor 1021 are shown in the upper part of FIG. 4. Waveforms of SCLK_H, SDO_H, CS__1 signal, CS__2 signal, CS__3 signal, and CS__4 signal output from the control signal processor 1021 to the individual controlled devices are shown in the lower part of FIG. 4.

First, when the CS_H signal is low, the MPU 201 is in the communication enable state with the control signal processor 1021.

Here, the MPU 201 transmits to the control signal processor 1021 the signal control command where CS__1 represents 0 and CS_2, CS_3, and CS_4 represent 1. The first sensor element 1011 is a controlled device acting as a control target.

On the other hand, while the CS_H signal is high, the control signal processor 1021 is in the communication disable state with the MPU 201.

On the basis of the signal control command, the control signal processor 1021 transmits a low CS_1 signal to the first sensor element 1011. The control signal processor 1021 brings the first sensor element 1011 into the communication enable state with the MPU 201. Similarly, on the basis of the signal control command, the control signal processor 1021 transmits a high CS__2 signal to the second sensor element 1012, a high CS__3 signal to the third sensor element 1013, and a high CS__4 signal to the memory 103. The control signal processor 1021 brings the second sensor element 1012, third sensor element 1013, and memory 103 into the communication disable state with the MPU 201.

While the MPU 201 is transmitting the high CS_H signal to the control signal processor 1021, the control signal processor 1021 is in the communication disable state with the MPU 201. The control signal processor 1021 outputs SCLK, SDI, and SDO directly to the SCLK_H signal line, SDI_H signal line, and SDO_H signal line, respectively. Accordingly, when the control signal processor 1021 is in the communication disable state, a control signal including control data indicating the contents of control of the control target can be exchanged between the MPU 201 and the first sensor element 1011 by three-wire serial communication.

Since the control signal processor 1021 ignores the control signal transmitted from the MPU 201 while the MPU 201 is transmitting the high CS_H signal to the control signal processor 1021, the control signal processor 1021 does not receive the control signal by accident.

When having transmitted the control signal to the first sensor element 1011, the MPU 201 makes the CS_H signal low. The control signal processor 1021 goes into the communication enable state with the MPU 201. Since the control signal processor 1021 blocks communication between the MPU 201 and the first sensor element 1011 acting as a control target, the control signal transmitted from the MPU 201 is not transmitted to the first sensor element 1011. While the MPU 201 is transmitting a low CS_H signal to the control signal processor 1021, SCLK_H and SDO_H are at specified values.

Then, the MPU 201 transmits to the control signal processor 1021 a signal control command where CS_1, CS_2, CS_3, and CS_4 represent 1. The control signal processor 1021 transmits a high CS__1 signal to the first sensor element 1011, second sensor element 1012, third sensor element 1013, and memory 103. The control signal processor 1021 brings each of the first sensor element 1011, second sensor element 1012, third sensor element 1013, and memory 103 into the communication disable state with the MPU 201. As described above, by controlling the control signal processor 1021 by the signal control command, the control signal processor 1021 can control the start and blocking of communication between the MPU 201 and the first sensor element 1011 reliably. Although the control signal processor 1021 has controlled one control target, it may control more than one control target simultaneously.

Figure 5:
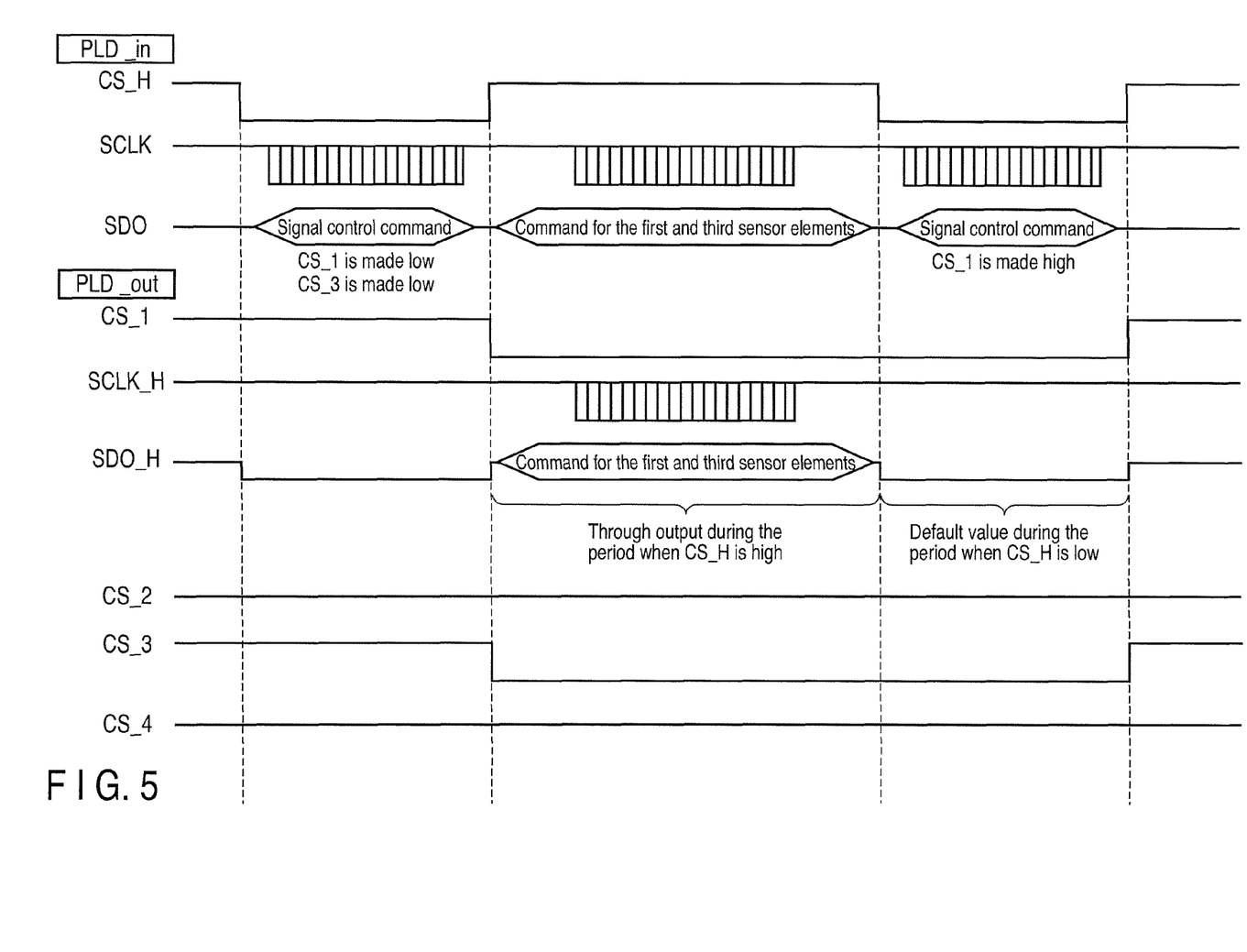
FIG. 5 is an exemplary timing chart in communicating with the first sensor element and a third sensor element according to the first embodiment.

FIG. 5 is a timing chart when the MPU 201 transmits a control signal to the first sensor element 1011 and third sensor element 1013 acting as control targets.

First, the MPU 201 transmits to the control signal processor 1021 a signal control command where CS__1 and CS__3 represent 0 and CS__2 and CS__4 represent 1. The control signal processor 1021 transmits a low CS__1 signal to the first sensor element 1011 acting as a control target. The control signal processor 1021 brings the first sensor element 1011 into the communication enable state with the MPU 201. Similarly, the control signal processor 1021 transmits a low CS__3 signal to the third sensor element 1013 acting as a control target. The control signal processor 1021 brings the third sensor element 1013 into the communication enable state with the MPU 201.

In addition, the control signal processor 1021 transmits a high CS__2 signal to the second sensor element 1012 not acting as a control target and a high CS__4 signal to the memory 103 not acting as a control target. The control signal processor 1021 brings the second sensor element 1012 and memory 103 into the communication disable state with the MPU 201. While the MPU 201 is transmitting the high CS_H signal to the control signal processor 1021, the control signal processor 1021 is in the communication disable state with the MPU 201. Accordingly, the MPU 201 can make three-wire serial communication with the first sensor element 1011 and third sensor element 1013.

When having transmitted commands to the first sensor element 1011 and third sensor element 1013 acting as control targets, the MPU 201 completes the transmission of the high CS_H signal and starts the transmission of the low CS_H signal. The control signal processor 1021 goes into the communication enable state with the MPU 201.

Then, the MPU 201 transmits to the control signal processor 1021 a signal control command where CS_1, CS_2, CS_3, and CS_4 represent 1. The control signal processor 1021 transmits a high CS_1 signal to the first sensor element 1011, second sensor element 1012, third sensor element 1013, and memory 103. The control signal processor 1021 brings each of the first sensor element 1011, second sensor element 1012, third sensor element 1013, and memory 103 into the communication disable state with the MPU 201. As described above, the MPU 201 can control the start and blocking of communication with more than one controlled device simultaneously by transmitting the signal control command and CS_H signal to the control signal processor 1021.

The first embodiment described above is a case where standard three-wire serial communication is used directly. Therefore, the number of signal lines between the MPU 201 and the control signal processor 1021 of the camera head 10 is four, three lines+CS_H. The number of signal lines can be reduced further by replacing the communication between the MPU 201 and the control signal processor 1021 of the camera head 10 with asynchronous one-way communication or single-line two-way communication.

Figure 6:
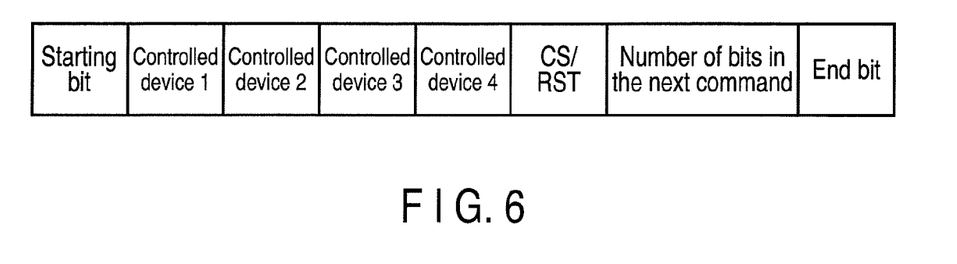
FIG. 6 is an exemplary configuration of a signal control command according to a second embodiment.

Furthermore, use of a suitable command enables the CS_H signal line to be eliminated between the MPU 201 and the control signal processor 1021 of the camera head 10. FIG. 6 shows the configuration of a selection command according to a second embodiment. FIG. 6 shows the configuration of a signal control command that is transmitted in asynchronous one-way communication when the CS_H signal line is eliminated. Since the configuration of a head separation camera apparatus of the second embodiment is the same as that of the first embodiment explained in FIG. 1, explanation of it will be omitted.

The signal control command has a fixed length. Suppose the MPU 201 does not transmit a command other than the signal control command to the control signal processor 1021. In addition, since the control signal processor 1021 need not control the CS signal and RST signal for a single controlled device simultaneously, the signal control command controls as many signals as twice the number of controlled devices by the four controlled devices respective bits and CS/RST select bit using as many bits as the number of controlled devices+1. In FIG. 6, controlled device 1 in the selection command represents a bit for the first sensor element 1011. Similarly, controlled device 2 represents a bit for the second sensor element 1011, controlled device 3 a bit for the third sensor element 1011, and controlled device 4 a bit for the memory 103.

The MPU 201 determines a controlled device and its command length and transmits a selection command to the control signal processor 1021. Receiving a starting bit, the control signal processor 1021 reads the command by the fixed length, analyzes it, and controls the four controlled devices. On the basis of the selection command, the control signal processor 1021 transmits a CS signal to the four controlled devices.

The control signal processor 1021 outputs the control signal transmitted from the MPU 201 directly by the number of bits set in the number of bits in a command next to the selection command. During the time, the control signal processor 1021 ignores the control signal transmitted from the MPU 201.

When the next command has been completed, the control signal processor 1021 transmits a high CS signal to each of the four controlled devices automatically. On the basis of the selection command shown in FIG. 6, the control signal processor 1021 can determine in what period the control signal has to be received or output directly. Accordingly, communication between the MPU 201 and control signal processor 1021 can be realized with only one signal line, the minimum command length, and the minimum communication time.

While in the embodiment, the control signal processor 1021 of the camera head 10 has been hooked up, an MPU or the like may be provided on the camera head 10 in place of the control signal processor 1021.

With the embodiment, use of the control signal processor 1021 (or MPU) provided on the camera head 10 to convert a video signal into a serial one enables the number of signal lines to be reduced. It is not necessary to provide a new integrated circuit (IC) on the camera head 10 to realize the embodiment. Since the MPU 201 controls the CS signal and RST signal to each of the controlled devices via the control signal processor 1021, the signal lines between the MPU 201 and each of the controlled devices are unnecessary. Accordingly, the number of signal lines between the camera head 10 and CCU 20 does not increase, regardless of an increase in the number of controlled devices. Consequently, the miniaturization of the camera head 10 can be enhanced effectively.

Furthermore, since the MPU 201 converts the control signals to each of the controlled devices into commands, standardizes the commands, and transmits them to the control signal processor 1021, it can control more than one controlled device simultaneously. For example, when the MPU 201 controls the first sensor element 1011, second sensor element 1012, and third sensor element 1013 in the same manner, the embodiment enables the communication time to be shortened.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A head separation camera apparatus comprising:
   an imaging device;
   a control device configured to control one or more controlled elements in the imaging device; and
   a cable configured to include a single control line for supplying a control signal and connect the imaging device and the control device,
   the control device including a first controller configured to output the control signal including a selection command to notify a controlled element acting as a control target from the controlled elements and control data indicating contents of control to the control target, and
   the imaging device including a second controller configured to transmit an individual selection command to inform whether or not the controlled element is the control target and to output the control data being output from the first controller directly to at least the controlled element acting as the control target, based on the selection command.

2. The apparatus of claim 1, wherein the second controller controls not to output the control data directly to the controlled element during receiving the selection command from the first controller.

3. The apparatus of claim 1, wherein the first controller transmits the selection command to set the controlled element acting as the control target as a non-control target after completing communication with the controlled element acting as the control target to the second controller.

4. The apparatus of claim 1, wherein the first controller transmits the control signal including a communication disable period during which communication between the first controller and the second controller is disabled to the second controller.

5. The apparatus of claim 4, wherein the second controller completes to output of the control data directly to the controlled element acting as the control target if the communication disable period expires.

6. The apparatus of claim 1, wherein the controlled element is a sensor element or memory.

7. An imaging device of a head separation camera apparatus, connected to a control device via a cable, comprising:
 a receiver configured to receive a control signal including a selection command to notify a controlled element acting as a control target from one or more controlled elements in the imaging device and control data indicating contents of control to a control target, from the control device which controls the controlled elements, and
 controller configured to transmit an individual selection command to inform whether or not the controlled element is a control target and to output the control data being output from the control device directly to at least the controlled element acting as the control target, based on the selection command received by the receiver.

8. The device of claim 7, wherein the controlled element is a sensor element or memory.

9. A head separation camera apparatus comprising:
 an imaging device; and
 a control device configured to control one or more controlled elements in the imaging device,
 the control device including a first controller configured to output a control signal including a selection command to notify a controlled element acting as a control target from the controlled elements and control data indicating contents of control to a control target, and
 the imaging device including a second controller configured to transmit an individual selection command to inform whether or not the controlled element is a control target and to output the control data being output from the first controller directly to at least the controlled element acting as the control target, based on the selection command.

10. The apparatus of claim 9, wherein the second controller controls not to output the control data directly to the controlled element during receiving the selection command from the first controller.

11. The apparatus of claim 9, wherein the first controller transmits the selection command to set the controlled element acting as the control target as a non-control target after completing communication with the controlled element acting as the control target to the second controller.

12. The apparatus of claim 9, wherein the first controller transmits the control signal including a communication disable period during which communication between the first controller and the second controller is disabled to the second controller.

13. The apparatus of claim 12, wherein the second controller completes transmission of the control data to the controlled element acting as the control target if the communication disable period expires.

14. The apparatus of claim 9, wherein the controlled element is a sensor element or memory.

15. An imaging device of a head separation camera apparatus, communicating with a control device, comprising:
 a receiver configured to receive a control signal including a selection command to notify a controlled element acting as a control target from one or more controlled elements in the imaging device and control data indicating contents of control to a control target, from the control device which controls the controlled elements, and
 controller configured to transmit an individual selection command to inform whether or not the controlled element is a control target and to output the control data being output from the control device directly to at least the controlled element acting as the control target, based on the selection command received by the receiver.

16. The device of claim 15, wherein the controlled element is a sensor element or memory.

17. A control method for a head separation camera apparatus comprising an imaging device, a control device configured to control one or more controlled elements in the imaging device, and a cable configured to include a single control line for supplying a control signal and connect the imaging device and the control device, comprising:
 outputting the control signal including a selection command to notify a controlled element acting as a control target from one or more controlled elements in the imaging device and control data indicating contents of control to a control target, at the control device, and
 transmitting an individual selection command to inform whether or not the controlled element is a control target and outputting the control data being output from the first controller directly to at least the controlled element acting as the control target, based on the selection command, at the imaging device.

18. The apparatus of claim 1, wherein the control target does not have data processing capability.

* * * * *